(12) United States Patent
Park

(10) Patent No.: US 11,738,609 B2
(45) Date of Patent: Aug. 29, 2023

(54) SYSTEM FOR DETERMINING ABNORMALITIES OF TPMS AND METHOD OF DETERMINATION

(71) Applicant: HYUNDAI MOBIS CO., LTD., Seoul (KR)

(72) Inventor: Bok Man Park, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 267 days.

(21) Appl. No.: 17/225,846

(22) Filed: Apr. 8, 2021

(65) Prior Publication Data

US 2021/0316576 A1 Oct. 14, 2021

(30) Foreign Application Priority Data

Apr. 10, 2020 (KR) ......................... 10-2020-0044326

(51) Int. Cl.
*B60C 23/04* (2006.01)

(52) U.S. Cl.
CPC ........ *B60C 23/0481* (2013.01); *B60C 23/045* (2013.01)

(58) Field of Classification Search
CPC ............. B60C 23/0481; B60C 23/045; B60C 23/0444; B60C 23/0464; B60C 23/0466; B60C 23/0479; B60C 23/0437; B60W 50/0205; B60W 2050/0019; B60W 2050/021; B60W 2050/0292; G01L 27/007; B60Y 2306/15; B60Y 2400/306
USPC .......................................................... 340/447
See application file for complete search history.

(56) References Cited

U.S. PATENT DOCUMENTS

2018/0117975 A1 * 5/2018 Choi .................. G01C 21/3691

FOREIGN PATENT DOCUMENTS

| JP | 2013060105 A | * | 4/2013 | |
| JP | 2019103095 A | * | 6/2019 | |
| KR | 863101 B1 | * | 10/2008 | |
| KR | 100863101 B1 | * | 10/2008 | |
| KR | 10-1401889 | | 5/2014 | |
| WO | WO-2019085862 A1 | * | 5/2019 | ......... B60C 23/0401 |

\* cited by examiner

*Primary Examiner* — Eric Blount
(74) *Attorney, Agent, or Firm* — DLA Piper LLP (US)

(57) ABSTRACT

A system for determining abnormalities of a TPMS that includes a pressure sensor that senses a pressure inside a tire and transmits sensed pressure data as a radio signal, a reception unit that receives the radio signal from the pressure sensor and measures strength of the received radio signal, and a determination unit that determines an abnormality of the TPMS based on the radio signal received, and the strength of the radio signal measured, by the reception unit.

13 Claims, 3 Drawing Sheets

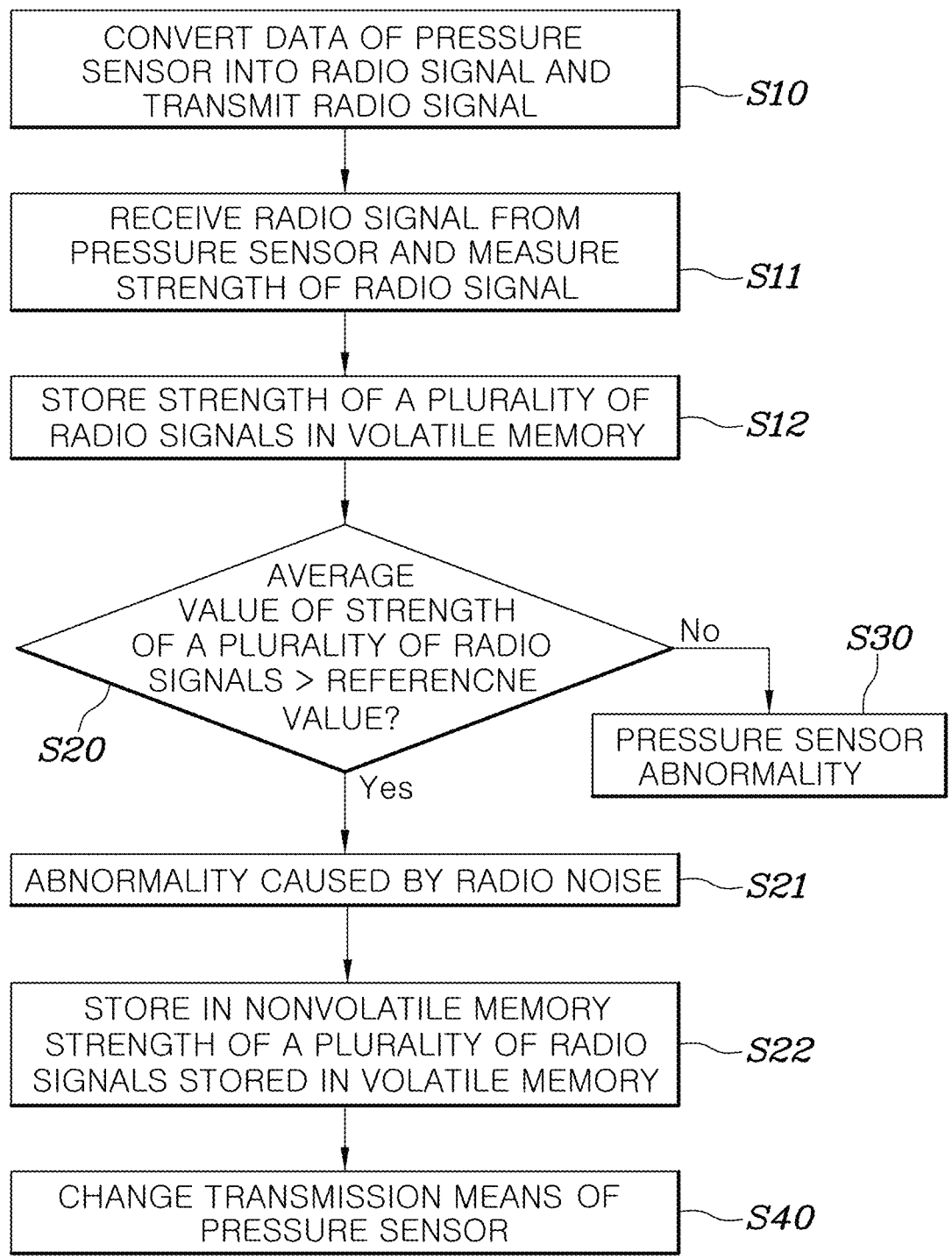

SYSTEM FOR DETERMINING ABNORMALITIES OF TPMS AND METHOD OF DETERMINATION

CROSS-REFERENCE TO RELATED APPLICATION

This application claims priority from Korean Patent Application No. 10-2020-0044326, filed on Apr. 10, 2020, in the Korean Intellectual Property Office, the disclosure of which is incorporated herein by reference in its entirety.

FIELD

The present invention relates to a system for determining abnormalities of TPMS and a method of controlling the same.

BACKGROUND

The present invention relates to an external noise signal warning method in a tire pressure monitoring system (TPMS), and in more detail, to a method of detecting abnormalities in signal reception caused by an external noise and warning against it or controlling consequent fail-safe.

In general, the TPMS is a system warning against a decrease in pressure in a tire and performs a function of transmitting tire condition variables such as pressure or temperature to an electronic control unit (ECU) inside a vehicle. Such a tire pressure monitoring system improves vehicle stability by providing information on a tire condition.

Since a pressure sensor 100 and a reception unit 200 perform radio communications in the TPMS, the system is determined to be a failure if the reception unit 200 fails to receive a signal for a certain period of time and a cluster C is warned of a failure state. However, passing through a strong electric field or presence of an external noise that may interfere with the TPMS signal around a vehicle causes a communication failure even if the system is normal, and normal communications between the pressure sensor 100 and the reception unit 200 are not performed. That is, when an external noise signal enters a vehicle, a communication failure occurs even if the pressure sensor 100 and the reception unit 200 are in normal states. In this case, the cluster C is warned of a system failure state conventionally. This raises a problem of inability to distinguish a system failure state caused by a system failure such as a failure of the pressure sensor 100 and the reception unit 200 from a temporary communication failure state caused by a simple external noise signal. It may also lead to a misconception on the part of drivers that the TPMS has frequent failures.

The matters described above as the technical background are only for better understanding of the background of the present invention and should not be taken as an acknowledgement that they correspond to the prior art already known to those with common knowledge in the related art.

SUMMARY

The present invention is proposed to solve such a problem and aims to provide a technique for determining whether an abnormality of a TPMS is caused by a radio noise or an abnormality of a pressure sensor.

A system for determining abnormalities of TPMS according to the present invention includes a pressure sensor that senses a pressure inside a tire and transmits sensed pressure data as a radio signal, a reception unit that receives the radio signal from the pressure sensor and measures strength of the received radio signal, and a determination unit that determines an abnormality of the TPMS based on the radio signal received, and the strength of the radio signal measured, by the reception unit.

The reception unit may measure strengths of a plurality of additional radio signals for predetermined second time periods at an interval of a predetermined first time period and a volatile memory that stores the strengths of the plurality of additional radio signals measured by the reception unit may be further included.

The determination unit may determine that the abnormality is caused by a radio noise when an average value of the strengths stored in the volatile memory is greater than a predetermined reference value while no data of the pressure sensor is received by the reception unit for the predetermined second time period.

The determination unit may determine that the pressure sensor is abnormal when the average value of the strengths stored in the volatile memory is less than a predetermined reference value while no data of the pressure sensor is received by the reception for the predetermined second time period.

A control unit that controls the pressure sensor to change a data transmission means based on the TPMS abnormality as determined by the determination unit may be further included.

The control unit may change the communication means of the pressure sensor from the radio signal to Bluetooth so as to transmit the pressure data of the pressure sensor to a Bluetooth module of a vehicle.

The control unit may change the communication means of the pressure sensor from the radio signal to Bluetooth so as to transmit the pressure data of the pressure sensor to a mobile terminal of a passenger.

A nonvolatile memory that stores the strengths of the plurality of additional radio signals stored in the volatile memory when the determination unit determines that the abnormality is caused by a radio noise may be further included, and the determination unit may determine that the abnormality is caused by a radio noise based on the strengths of the plurality of additional radio signals measured by the reception unit at the interval of the predetermined first time period and the strengths of the plurality of additional radio signals stored in the nonvolatile memory.

The determination unit may compare the strength of the radio signals stored in the volatile memory with the strength of the radio signals stored in the nonvolatile memory and may determine that the abnormality is caused by a radio noise when the strength of the radio signals stored in the nonvolatile memory is greater.

A method of determining abnormalities of the TPMS according to the present invention includes a signal transmission step of converting the data of the pressure sensor that measures the pressure into a radio signal and transmitting the radio signal, a reception step of receiving the radio signal of the pressure sensor transmitted in the signal transmission step and measuring a strength of the radio signal, and a determination step of determining an abnormality of the TPMS based on the radio signals received, and the strength of the radio signals measured, in the reception step.

A first storage step of storing strengths of a plurality of additional radio signals in the volatile memory at the interval of the predetermined first time period after the reception step may be further included.

When it is determined that the average value of the strengths stored in the first storage step is greater than the predetermined reference value, the determination step subsequently may proceed to a first determination step of determining that the abnormality is caused by a radio noise.

A second storage step of storing in the nonvolatile memory the strength of the plurality of additional radio signals stored in the volatile memory after the first determination step may be further included, and the abnormality caused by a radio noise may be determined based on the strengths of the plurality of additional radio signals stored in the first storage step and the second storage step.

A sensor control step of changing the transmission means of the pressure senor after the second storage step may be further included.

When it is determined that the average value of the strength of a plurality of radio signals stored in the first storage step is less than the predetermined strength value of the radio signal, the determination step may proceed to a second determination step of determining that the pressure sensor is abnormal.

A system for determining abnormalities of the TPMS according to the present invention has an effect of determining that an abnormality of the TPMS is caused by a radio noise or that an abnormality of the TPMS is caused by the pressure sensor to be able to inform a passenger.

In addition, when an abnormality of the TPMS caused by the radio noise occurs, the control unit changes the transmission means of the pressure sensor to Bluetooth, so that the data of the pressure sensor may be checked through a Bluetooth module of a vehicle or a mobile terminal of a passenger.

BRIEF DESCRIPTION OF THE DRAWINGS

FIG. 3 is a flowchart showing a method of determining abnormalities of TPMS according to an embodiment of the present invention.

DETAILED DESCRIPTION OF THE EMBODIMENTS

Figure 1:
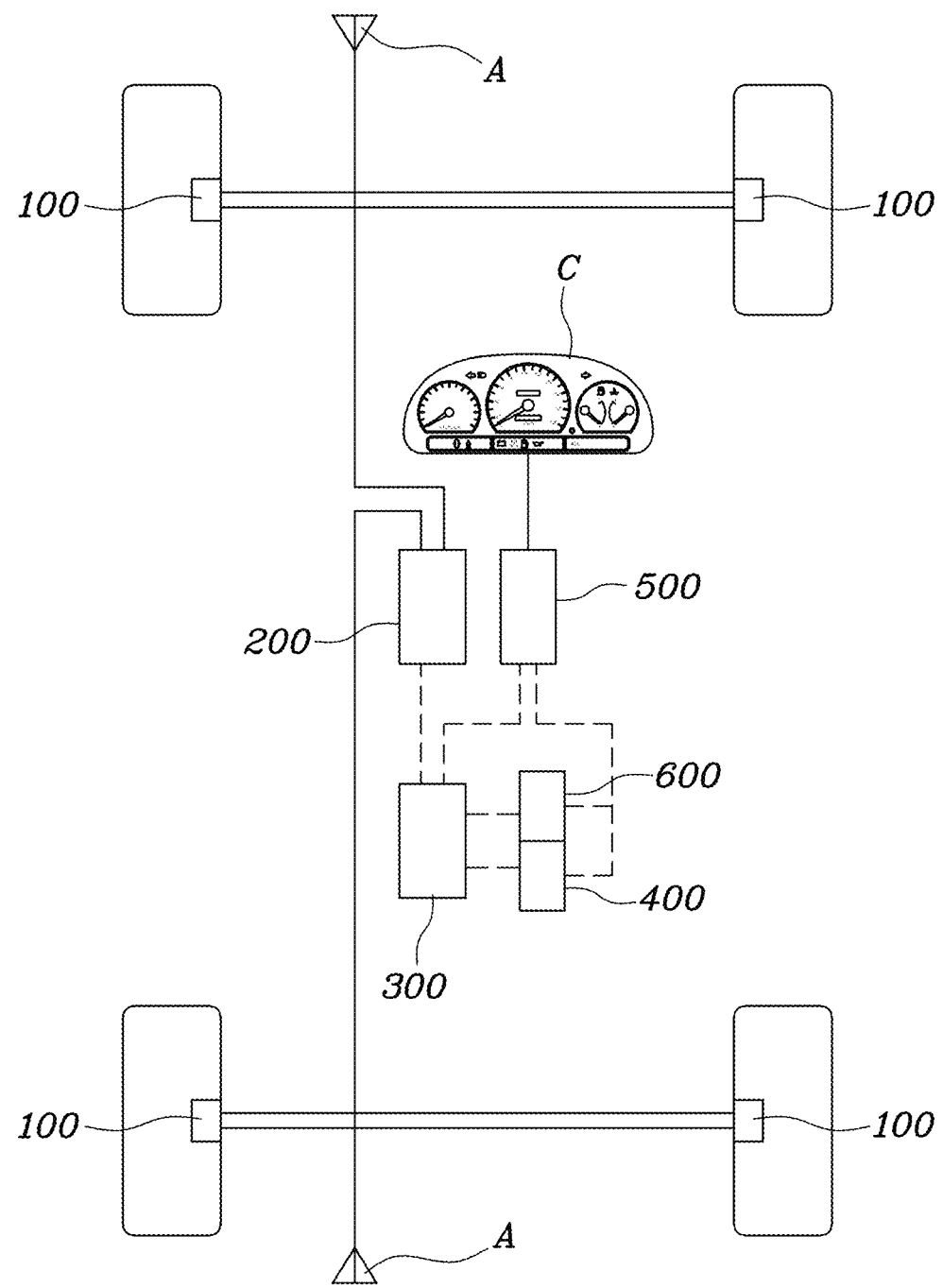
FIG. 1 is a view showing a configuration of a system for determining abnormalities of TPMS according to an embodiment of the present invention.

Specific structural or functional descriptions of the embodiments of the present invention disclosed in the present specification or application are presented by way of examples only for the purpose of describing the embodiments according to the present invention, and the embodiments according to the present invention may be implemented in various forms and should not be construed as being limited to the embodiments described in the present specification or application.

Since the embodiments according to the present invention may be modified in various ways and have various forms, specific embodiments will be illustrated in the drawings and described in detail in the present specification or application. However, this is not intended to limit the embodiments according to the concept of the present invention to a specific disclosure form and should be construed as including all modifications, equivalents, and substitutes included in the spirit and technical scope of the present invention.

Terms such as first and/or second may be used to describe various components, but the components should not be limited by the terms. The terms only serve the purpose of distinguishing one component from other components. For example, the first component may be referred to as the second component, and similarly, the second component may also be referred to as the first component without deviating from the scope of the right according to the concept of the present invention.

When a component is referred to as being "connected" or "coupled" to another component, it may be directly connected or coupled to the another component, but it should be understood that other components may exist in between. On the other hand, when a component is referred to as being "directly connected" or "directly coupled" to another component, it should be understood that there is no other component in between. Other expressions describing the relationship between components such as "between" and "just between" or "adjacent to" and "directly adjacent to" should be interpreted in the same manner.

The terms used in the present specification are only used to describe specific embodiments and are not intended to limit the present invention. Singular expressions include plural expressions unless the context clearly indicates otherwise. In the present specification, terms such as "comprise" or "have" are intended to designate the presence of implemented features, numbers, steps, actions, components, parts, or combinations thereof and should not be understood to preclude the presence or additional possibilities of one or more of other features, numbers, steps, actions, components, parts or combinations thereof in advance.

Unless otherwise defined, all terms used herein, including technical or scientific terms, have the same meanings as are generally understood by those with common knowledge in the art to which the present invention belongs. The terms such as those defined in a generally used dictionary should be interpreted as having meanings consistent with the meanings in the context of the related technology and should not be interpreted as an idealistic or excessively formal meaning unless explicitly defined in the present specification.

Hereinafter, the present invention will be described in detail by describing preferred embodiments of the present invention with reference to the accompanying drawings. The same reference numerals shown in each drawing indicate the same members.

An algorithm configured to control the operations of various components of a vehicle or a nonvolatile memory (not shown) configured to store data relating to software commands for reproducing the algorithm and the data stored in the memory may be used to implement a control unit according to an exemplary embodiment of the present invention through a processor (not shown) configured to performs the operations to be described below. Here, the memory and the processor may be implemented as individual chips. Alternatively, the memory and processor may be implemented as a single chip integrated with each other. The processor may take the form of one or more processors.

Figure 2:
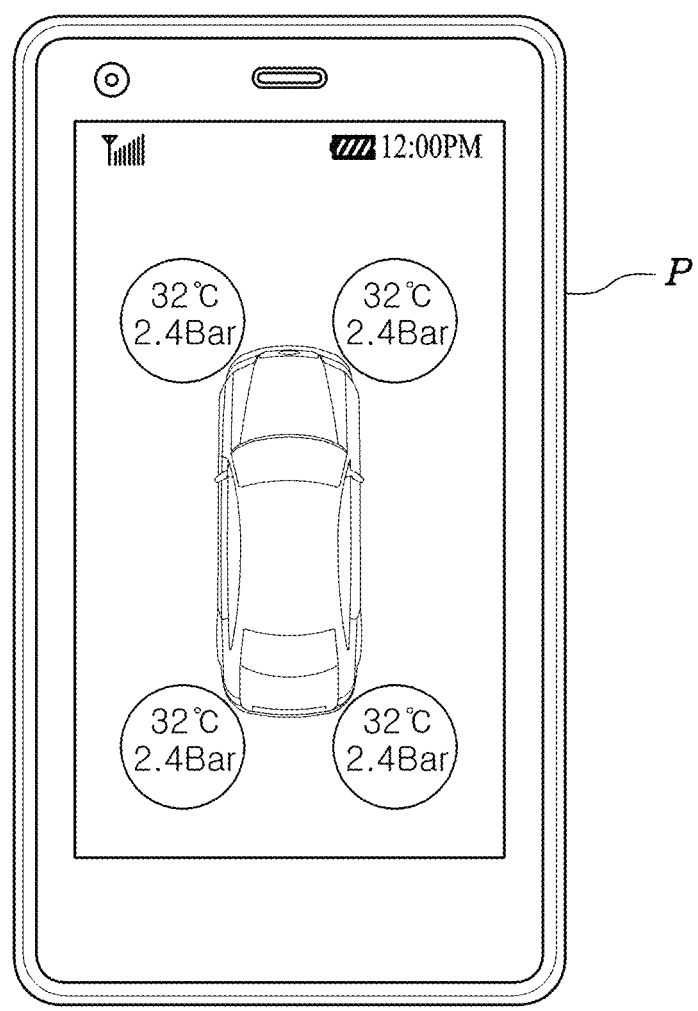
FIG. 2 is a view showing tire pressure information by a passenger's mobile terminal using Bluetooth in a system for determining abnormalities of TPMS according to an embodiment of the present invention.

FIG. 1 is a view showing a configuration of a system for determining abnormalities of TPMS according to an embodiment of the present invention. FIG. 2 is a view showing tire pressure information by a passenger's mobile terminal using Bluetooth in a system for determining abnormalities of TPMS according to an embodiment of the present invention.

Hereinafter, the system for determining abnormalities of TPMS according to an embodiment of the present invention will be described with reference to accompanying FIGS. 1 and 2.

In general, a tire pressure monitoring system (TPMS) is a system continuously monitoring the air pressure inside a tire and transmits tire condition variables such as pressure or temperature to a control unit 500 inside a vehicle. The tire pressure monitoring system provides information on the tire condition, thereby improving vehicle stability.

A reception unit 120 that receives signals of the pressure sensor 100 in the TPMS receive the signals of the pressure sensor 100 by a radio signal.

However, when the reception unit 200 receives the radio signals of the pressure sensor 100, a noise is generated by the radio signals of surrounding electronic devices due to the development of the electronic devices, and the reception unit 200 recognizes that the sensor is malfunctioning even when the pressure sensor 100 operates normally.

A system for determining abnormalities of TPMS according to the present invention is developed to solve this problem.

The system for determining abnormalities of TPMS according to an embodiment of the present invention may determine that the abnormality is caused by a noise or that the pressure sensor 100 is abnormal based on a radio signal indicator (RSSI) received by the reception unit 200.

Specifically, the system for determining abnormalities of TPMS according to the present invention includes a pressure sensor 100 that senses the pressure inside a tire and transmits the sensed pressure data as a radio signal, a reception unit 200 that receives the radio signal from the pressure sensor 100 and measures the strength of the received radio signals, and a determination unit 300 that determines the TPMS abnormality based on the radio signals received, and the strength of the radio signal measured, by the reception unit 200.

Further referring to FIG. 1, the pressure sensor 100 may measure an appropriate pressure of a tire while the vehicle is running, and also measure temperature inside the tire, convert the data into a radio signal, and transmit the radio signal. Accordingly, the pressure and internal temperature of the tire are measured and transmitted to a passenger in real time and an alert is issued to the passenger through a cluster C when the tire pressure declines, so that vehicle accidents caused by the tire pressure decline may be prevented.

The reception unit 200 may receive radio signals of the pressure sensor 100, measure the signal strength, and regularly measure the noise strength of an operating band.

The reception unit 200, connected to an antenna A, may receive radio signals transmitted from the pressure sensor 100, measure the strength of the received radio signals and input it into the determination unit 300.

The strength of the radio signal differs for each device that transmits the radio signals, and a noise is generated when a plurality of radio signals are transmitted to the antenna A, which leads to a concern that the radio signals of the pressure sensor 100 may not be accurately received.

The determination unit 300 is connected to the reception unit 200 by a control line, and the control line is denoted by a dotted line in the drawing.

When the radio signals of the pressure sensor 100 are not inputted while the radio signals of the pressure sensor 100 received by the reception unit 200 and the strength data of the radio signals transmitted to the reception unit 200 are inputted, the determination unit 300 checks the strength data of the radio signals inputted into the reception unit 200 and determines whether the TPMS abnormality is caused by a radio noise to prevent the unnecessary repair job of the TPMS, thereby generating the effect of improving the efficiency in vehicle maintenance.

The reception unit 200 measures the strength of a plurality of radio signals for a predetermined second time period at an interval of a predetermined first time period and a volatile memory 400 that stores the strength of the plurality of radio signals measured by the reception unit 200 is further included.

The reception unit 200 may measure the strength of a plurality of radio signals for the predetermined second time period at the interval of the predetermined first time period and store it in the volatile memory 400, and the strength data of the radio signals inputted in the volatile memory 400 before the predetermined second time period is deleted when the new strength data of the radio signals is inputted after the predetermined first time period.

Accordingly, the volatile memory 400 may continue to store the strength data of the radio signals, the number of data being obtained by diving the second time period by the first time period.

According to an embodiment of the present invention, the predetermined first time period may be set at 10 seconds and the predetermined second time period may be set at nine minutes so that 54 data may be stored in the volatile memory 400. These time periods may be changed by a setter.

The determination unit 300 determines that the abnormality is caused by a radio noise when the average value of the plurality of radio signal strength stored in the volatile memory 400 is greater than a predetermined reference value while no data of the pressure sensor 100 is received by the reception unit 200 for the predetermined second time period.

When no radio signal of the pressure sensor 100 is received by the reception unit 200 for nine minutes which is the predetermined second time period, the determination unit 300 may compare the average value of a plurality of radio signal strength stored in the volatile memory 400 with the predetermined reference value, determine that the TPMS abnormality is caused by a radio noise when the average value of the plurality of radio signal strength is greater than the predetermined reference value, and inform the passenger through the cluster C.

The determination unit 300 determines that the pressure sensor 100 is abnormal when the average value of a plurality of radio signal strength stored in the volatile memory 400 is less than the predetermined reference value while no data of the pressure sensor 100 is received by the reception 200 for the predetermined second time period.

When no radio signal of the pressure sensor 100 is received by reception unit 200 for nine minutes which is the predetermined second time period, the determination unit 300 may determine that the pressure sensor 300 is abnormal when the average value of a plurality of radio signal strength stored in the volatile memory 400 is compared with the predetermined reference value and the average value of the plurality of radio signal strength is less than the predetermined reference value.

After that, the passenger may be warned through the cluster C to have the vehicle repaired.

A control unit 500 that controls the pressure sensor 100 to change the data transmission means based on the TPMS abnormality as determined by the determination unit 300 is further included.

The control unit 500 may control to change the transmission means of the pressure sensor 100 from the radio signal to another means other than the radio signal so that the information of the pressure sensor 100 may be accurately inputted into the control unit 500 even when the radio signal of the pressure sensor 100 is not inputted because of the radio noise.

Accordingly, there is an effect of transmitting the information of the pressure sensor 100 to the passenger even when a radio noise occurs.

The control unit 500 changes a communication means of the pressure sensor 100 from a radio signal to the Bluetooth so as to transmit the pressure data of the pressure sensor 100 to a Bluetooth module of the vehicle.

The control unit 500 may accurately transmit the information of the pressure sensor 100 to the passenger through the cluster C by changing the transmission means of the pressure sensor 100 from a radio signal to the Bluetooth to receive data of the pressure sensor 100 and inform the passenger and transmitting the information to the Bluetooth module provided in the vehicle.

Accordingly, even if a radio noise occurs, the noise may be avoided and the information of the pressure sensor 100 may be transmitted to the passenger.

The control unit 500 changes the communication means of the pressure sensor 100 from a radio signal to the Bluetooth so as to transmit the pressure data of the pressure sensor 100 to the mobile terminal P of the passenger.

When the vehicle is not provided with the Bluetooth after the transmission means of the pressure sensor 100 is changed to the Bluetooth, the control unit 500 may transmit the information of the pressure sensor 100 to the passenger by transmitting it to the mobile terminal P of the passenger.

A nonvolatile memory 600 is further included which stores the strength of a plurality of radio signals stored in the volatile memory 400 when the determination unit 300 determines that the abnormality is caused by a radio noise, and the determination unit 300 determines that the abnormality is caused by a radio noise based on the strength of a plurality of the radio signals measured at the interval of the predetermined first time period by the reception unit 200 and the strength of the plurality of the radio signals stored in the nonvolatile memory 600.

When it is determined that the TPMS abnormality is caused by a radio noise, the determination unit 300 may store in the nonvolatile memory 600 all the strength of the radio signals stored in the volatile memory for the predetermined second time period at the interval of the predetermined first time period, compare it with the strength of the radio signals stored in the nonvolatile memory 600 when the same radio noise occurs after the radio noise is resolved, and determine the TPMS abnormality with respect to the radio noise.

The determination unit 300 compares the strength of the radio signals stored in the volatile memory 400 with the strength of the radio signals stored in the nonvolatile memory 600 and determines that the abnormality is caused by a radio noise when the strength of the radio signals stored in the nonvolatile memory 600 is greater.

When a radio noise occurs, the determination unit 300 may compare the average value of the radio signal strength of the radio noise stored in the nonvolatile memory 600 with the radio signal strength of the current radio noise and determine that the TPMS abnormality is caused by the radio noise when the radio signal strength of the current radio noise is greater than the average value of the radio signal strength of the radio noise stored in the nonvolatile memory 600.

Accordingly, it is possible to determine in advance that the TPMS abnormality is caused by a radio noise before storing in the volatile memory 400, generating an effect of being able to get prepared.

FIG. 3 is a flowchart showing a method of determining abnormalities of TPMS according to an embodiment of the present invention.

Further referring to FIG. 3, the method of determining abnormalities of TPMS according to the embodiment of the present invention includes a signal transmission step S10 of converting data of the pressure sensor 100 that measures the tire pressure into a radio signal and transmitting the radio signal, a reception step S11 of receiving the radio signal of the pressure sensor 100 transmitted in the signal transmission step S10 and measuring the radio signal strength, and a determination step S20 of determining the TPMS abnormality based on the radio signals received, and the strength of the radio signal measured, in the reception step S11.

In the signal transmission step S10, the tire internal pressure data measured by the pressure sensor 100 is transmitted by a radio wave, and, in the reception step S11, the radio wave transmitted in the signal transmission step S10 may be converted into data and transmitted and the radio signal strength of the received radio wave may be measured.

In the determination step S20, the data of the pressure sensor 100 received in the reception step S11 may be collected and whether the TPMS abnormality is caused by a noise may be determined by comparing the radio signal strength received in the reception S11 when the noise radio wave occurs with the predetermined value while monitoring the radio signal strength measured in the reception step S11.

Also, it may be determined that the pressure sensor 100 is abnormal when the TPMS abnormality is not caused by a noise.

A first storage step S12 of storing the strength of a plurality of radio signals at the interval of the predetermined first time period in the volatile memory 400 after the reception step S11 is further included.

In the first storage step S12, the radio signal strength measured in the reception step S11 may be stored in the volatile memory 400 and the radio signal strength may be monitored at the interval of the predetermined first time period for the second time period.

When it is determined that the average value of the plurality of radio signal strength stored in the first storage step S12 is greater than the predetermined reference value, the determination step S20 subsequently proceeds to a second storage step S21 of determining that the abnormality is caused by a radio noise.

In the second storage step S21, if no data is transmitted from the pressure sensor 100, it may be determined that the TPMS abnormality is caused by a radio noise when the average value of the radio signal strength based on the radio signal strength monitored in the first storage step S12 and the predetermined reference value are compared and the average value of the radio signal strength is determined to be greater than the predetermined reference value.

A second storage step S22 of storing in a nonvolatile memory 600 a plurality of radio signal strength stored in the volatile memory 400 after the second storage step S21 is further included, and it is determined in the determination step S20 that the abnormality is caused by a radio noise based on the radio signal strength stored in the first storage step S12 and the second storage step S22.

After the second storage step S22, a sensor control step S40 of changing the transmission means of the pressure sensor 100 is further included.

In the sensor control step S40, the data of the pressure sensor 100 may be transmitted to the Bluetooth module of the vehicle or the mobile terminal P of the passenger by changing the transmission means of the pressure sensor 100 to the Bluetooth.

When it is determined that the average value of a plurality of radio signal strength stored in the first storage step S12 is less than the predetermined radio signal strength value, the determination step S20 subsequently proceeds to a second determination step S30 of determining that the pressure sensor 100 is abnormal.

Specific embodiments of the present invention is illustrated and described, but it will be self-evident to those with common knowledge in the related art that the present invention may be improved and modified in various ways within the scope of the technical spirit of the present invention provided by the patent claims below.

What is claimed is:

1. A system for determining abnormalities of a tire pressure monitoring system (TPMS), the system comprising:
   a pressure sensor that senses a pressure inside a tire and transmits sensed pressure data as a radio signal;
   a reception unit that receives the radio signal from the pressure sensor and measures strength of the received radio signal;
   a determination unit that determines an abnormality of the TPMS based on the radio signal received, and the strength of the radio signal measured, by the reception unit; and
   a control unit that controls the pressure sensor to change a data transmission means based on the TPMS abnormality as determined by the determination unit.

2. A system for determining abnormalities of a tire pressure monitoring system (TPMS), the system comprising:
   a pressure sensor that senses a pressure inside a tire and transmits sensed pressure data as a radio signal;
   a reception unit that receives the radio signal from the pressure sensor and measures strength of the received radio signal; and
   a determination unit that determines an abnormality of the TPMS based on the radio signal received, and the strength of the radio signal measured, by the reception unit;
   wherein the reception unit measures strengths of a plurality of additional radio signals for a predetermined second time period at an interval of a predetermined first time period, and
   the system further comprises a volatile memory that stores the strengths of the plurality of additional radio signals measured by the reception unit.

3. The system for determining abnormalities of TPMS according to claim 2, wherein
   the determination unit determines that the abnormality is caused by a radio noise when an average value of the strengths stored in the volatile memory is greater than a predetermined reference value while no data of the pressure sensor is received by the reception unit for a predetermined second time period.

4. The system for determining abnormalities of TPMS according to claim 2, wherein
   the determination unit determines that the pressure sensor is abnormal when an average value of the strengths stored in the volatile memory is less than a predetermined reference value while no data of the pressure sensor is received by the reception unit for a predetermined second time period.

5. The system for determining abnormalities of TPMS according to claim 1, wherein
   the control unit changes a communication means of the pressure sensor from a radio signal to Bluetooth so as to transmit the pressure data of the pressure sensor to a Bluetooth module of a vehicle.

6. The system for determining abnormalities of TPMS according to claim 1, wherein
   the control unit changes a communication means of the pressure sensor from a radio signal to Bluetooth so as to transmit the pressure data of the pressure sensor to a mobile terminal of a passenger.

7. The system for determining abnormalities of TPMS according to claim 2 further includes a nonvolatile memory that stores the strengths of the plurality of additional radio signals stored in the volatile memory when the determination unit determines that the abnormality is caused by a radio noise, wherein
   the determination unit determines that the abnormality is caused by a radio noise based on the strengths of the plurality of additional radio signals measured by the reception unit at the interval of the predetermined first time period and the strengths of the plurality of additional radio signals stored in the nonvolatile memory.

8. The system for determining abnormalities of TPMS according to claim 7, wherein
   the determination unit compares the strength of the radio signal stored in the volatile memory with the strength of the radio signal stored in the nonvolatile memory and determines that the abnormality is caused by the radio noise when the strength of the radio signal stored in the nonvolatile memory is greater.

9. A method of determining abnormalities of a tire pressure monitoring system (TPMS), the method comprising:
   a signal transmission step of converting data of a pressure sensor that measures a pressure of a tire into a radio signal and transmitting the radio signal;
   a reception step of receiving the radio signal of the pressure sensor transmitted in the signal transmission step and measuring a strength of the radio signal;
   a determination step of determining an abnormality of the TPMS based on the radio signal received, and the strength of the radio signal measured, in the reception step; and
   a first storage step of storing strengths of a plurality of additional radio signals at an interval of a predetermined first time period in a volatile memory after the reception step.

10. The method of determining abnormalities of TPMS according to claim 9, wherein
    the determination step proceeds to a first determination step of determining that an abnormality is caused by a radio noise when an average value of the strengths stored in the first storage step is greater than a predetermined reference value.

11. The method of determining abnormalities of TPMS according to claim 10 further includes a second storage step of storing in a nonvolatile memory the strength of the plurality of additional radio signals stored in the volatile memory after the first determination step, wherein
    it is subsequently determined in the determination step that the abnormality is caused by a radio noise, based on the strengths of the plurality of additional radio signals stored in the first storage step and the second storage step.

12. The method of determining abnormalities of TPMS according to claim 11 further includes a sensor control step of changing a transmission means of the pressure sensor after the second storage step.

13. The method of determining abnormalities of TPMS according to claim 9, wherein the determination step proceeds to a second determination step of determining that the pressure sensor is abnormal when an average value of the strength of a plurality of radio signals stored in the first storage step is less than a predetermined strength of a radio signal.

\* \* \* \* \*